United States Patent
Krini et al.

(10) Patent No.: US 9,613,633 B2
(45) Date of Patent: Apr. 4, 2017

(54) SPEECH ENHANCEMENT

(71) Applicant: NUANCE COMMUNICATIONS, INC., Burlington, MA (US)

(72) Inventors: Mohamed Krini, Ulm (DE); Ingo Schalk-Schupp, Ulm (DE); Patrick Hannon, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/438,757

(22) PCT Filed: Oct. 30, 2012

(86) PCT No.: PCT/US2012/062549
§ 371 (c)(1),
(2) Date: Apr. 27, 2015

(87) PCT Pub. No.: WO2014/070139
PCT Pub. Date: May 8, 2014

(65) Prior Publication Data
US 2015/0255083 A1 Sep. 10, 2015

(51) Int. Cl.
*G10L 21/00* (2013.01)
*G10L 21/0208* (2013.01)
(Continued)

(52) U.S. Cl.
CPC .......... *G10L 21/0208* (2013.01); *G10L 13/00* (2013.01); *G10L 15/00* (2013.01);
(Continued)

(58) Field of Classification Search
USPC .................. 704/226–233, 246, 247, 251, 252
See application file for complete search history.

(56) References Cited

U.S. PATENT DOCUMENTS

| 4,015,088 A | 3/1977 | Dubnowski et al. |
| 4,052,568 A | 10/1977 | Jankowski |

(Continued)

FOREIGN PATENT DOCUMENTS

| CN | 101350108 A | 1/2009 |
| CN | 102035562 A | 4/2011 |

(Continued)

OTHER PUBLICATIONS

International Search Report, PCT/US2012/62549, date of mailing Jan. 4, 2013, 2 pages.

(Continued)

*Primary Examiner* — Leonard Saint Cyr
(74) *Attorney, Agent, or Firm* — Daly, Crowley, Mofford & Durkee, LLP

(57) ABSTRACT

A speech signal processing system is described for use with automatic speech recognition and hands free speech communication. A signal pre-processor module transforms an input microphone signal into corresponding speech component signals. A noise suppression module applies noise reduction to the speech component signals to generate noise reduced speech component signals. A speech reconstruction module produces corresponding synthesized speech component signals for distorted speech component signals. A signal combination block adaptively combines the noise reduced speech component signals and the synthesized speech component signals based on signal to noise conditions to generate enhanced speech component signals for automatic speech recognition and hands free speech communication.

20 Claims, 3 Drawing Sheets

(51) Int. Cl.
*G10L 13/00* (2006.01)
*G10L 15/00* (2013.01)
*G10L 13/02* (2013.01)
*G10L 15/20* (2006.01)
*G10L 19/04* (2013.01)

(52) U.S. Cl.
CPC .............. *G10L 13/02* (2013.01); *G10L 15/20* (2013.01); *G10L 19/04* (2013.01)

(56) References Cited

U.S. PATENT DOCUMENTS

| | | |
|---|---|---|
| 4,057,690 A | 11/1977 | Vagliani et al. |
| 4,359,064 A | 11/1982 | Kimble |
| 4,410,763 A | 10/1983 | Strawcyznski et al. |
| 4,672,669 A | 6/1987 | DesBlache et al. |
| 4,688,256 A | 8/1987 | Yasunaga |
| 4,764,966 A | 8/1988 | Einkauf et al. |
| 4,825,384 A | 4/1989 | Sakurai |
| 4,829,578 A | 5/1989 | Roberts |
| 4,864,608 A | 9/1989 | Miyamoto et al. |
| 4,914,692 A | 4/1990 | Hartwell et al. |
| 5,034,984 A | 7/1991 | Bose |
| 5,048,080 A | 9/1991 | Bell et al. |
| 5,125,024 A | 6/1992 | Gokcen et al. |
| 5,155,760 A | 10/1992 | Johnson et al. |
| 5,220,595 A | 6/1993 | Uehara |
| 5,239,574 A | 8/1993 | Brandman et al. |
| 5,349,636 A | 9/1994 | Irribarren |
| 5,394,461 A | 2/1995 | Garland |
| 5,416,887 A | 5/1995 | Shimada |
| 5,434,916 A | 7/1995 | Hasegawa |
| 5,475,791 A | 12/1995 | Schalk et al. |
| 5,574,824 A | 11/1996 | Slyh et al. |
| 5,577,097 A | 11/1996 | Meek |
| 5,581,620 A | 12/1996 | Brandstein et al. |
| 5,652,828 A | 7/1997 | Silverman |
| 5,708,704 A | 1/1998 | Fisher |
| 5,708,754 A | 1/1998 | Wynn |
| 5,721,771 A | 2/1998 | Higuchi et al. |
| 5,761,638 A | 6/1998 | Knittle et al. |
| 5,765,130 A | 6/1998 | Nguyen |
| 5,784,484 A | 7/1998 | Umezawa |
| 5,959,675 A | 9/1999 | Mita et al. |
| 5,978,763 A | 11/1999 | Bridges |
| 6,018,771 A | 1/2000 | Hayden |
| 6,061,651 A | 5/2000 | Nguyen |
| 6,098,043 A | 8/2000 | Forest et al. |
| 6,246,986 B1 | 6/2001 | Ammicht et al. |
| 6,266,398 B1 | 7/2001 | Nguyen |
| 6,279,017 B1 | 8/2001 | Walker |
| 6,373,953 B1 | 4/2002 | Flaks |
| 6,449,593 B1 | 9/2002 | Valve |
| 6,496,581 B1 | 12/2002 | Finn et al. |
| 6,526,382 B1 | 2/2003 | Yuschik |
| 6,574,595 B1 | 6/2003 | Mitchell et al. |
| 6,636,156 B2 | 10/2003 | Damiani et al. |
| 6,647,363 B2 | 11/2003 | Claassen |
| 6,717,991 B1 | 4/2004 | Gustafsson et al. |
| 6,778,791 B2 | 8/2004 | Shimizu et al. |
| 6,785,365 B2 | 8/2004 | Nguyen |
| 7,065,486 B1 | 6/2006 | Thyssen |
| 7,068,796 B2 | 6/2006 | Moorer |
| 7,069,213 B2 | 6/2006 | Thompson |
| 7,069,221 B2 | 6/2006 | Crane et al. |
| 7,117,145 B1 | 10/2006 | Venkatesh et al. |
| 7,162,421 B1 | 1/2007 | Zeppenfeld et al. |
| 7,171,003 B1 | 1/2007 | Venkatesh et al. |
| 7,206,418 B2 | 4/2007 | Yang et al. |
| 7,224,809 B2 | 5/2007 | Hoetzel |
| 7,274,794 B1 | 9/2007 | Rasmussen |
| 7,643,641 B2 | 1/2010 | Haulick et al. |
| 8,000,971 B2 | 8/2011 | Ljolje |
| 8,050,914 B2 | 11/2011 | Schmidt et al. |
| 8,359,195 B2 * | 1/2013 | Li .......................... G10L 17/02 381/98 |
| 8,706,483 B2 | 4/2014 | Gerl et al. |
| 2001/0038698 A1 | 11/2001 | Breed et al. |
| 2002/0184031 A1 | 12/2002 | Brittan et al. |
| 2003/0072461 A1 | 4/2003 | Moorer |
| 2003/0100345 A1 | 5/2003 | Gum |
| 2003/0185410 A1 | 10/2003 | June et al. |
| 2004/0047464 A1 | 3/2004 | Yu et al. |
| 2004/0076302 A1 | 4/2004 | Christoph |
| 2004/0230637 A1 | 11/2004 | Lecoueche et al. |
| 2005/0265560 A1 | 12/2005 | Haulick et al. |
| 2006/0206320 A1 * | 9/2006 | Li ....................... G10L 21/0208 704/226 |
| 2006/0222184 A1 | 10/2006 | Buck et al. |
| 2006/0271370 A1 * | 11/2006 | Li ......................... G10L 15/005 704/277 |
| 2007/0010291 A1 * | 1/2007 | Deng .................. G10L 21/0208 455/563 |
| 2007/0230712 A1 | 10/2007 | Belt et al. |
| 2008/0004881 A1 | 1/2008 | Attwater et al. |
| 2008/0077399 A1 | 3/2008 | Yoshida |
| 2008/0107280 A1 | 5/2008 | Haulick et al. |
| 2009/0112579 A1 | 4/2009 | Li et al. |
| 2009/0119096 A1 | 5/2009 | Gerl et al. |
| 2010/0189275 A1 | 7/2010 | Christoph |
| 2010/0250242 A1 * | 9/2010 | Li .......................... G10L 17/02 704/200.1 |
| 2012/0259626 A1 | 10/2012 | Li et al. |

FOREIGN PATENT DOCUMENTS

| | | |
|---|---|---|
| DE | 101 56 954 A1 | 6/2003 |
| DE | 10 2005 002 865 B3 | 6/2006 |
| EP | 0 053 584 | 6/1982 |
| EP | 0 856 834 A2 | 8/1998 |
| EP | 1 083 543 A2 | 3/2001 |
| EP | 1 116 961 A2 | 7/2001 |
| EP | 1 343 351 A1 | 9/2003 |
| EP | EP 1 850 328 A1 | 10/2007 |
| EP | 2 058 803 | 5/2009 |
| EP | 2 107 553 A1 | 10/2009 |
| EP | 2 148 325 A1 | 1/2010 |
| GB | 2 097 121 A | 10/1982 |
| WO | WO 94/18666 | 8/1994 |
| WO | WO 02/32356 A1 | 4/2002 |
| WO | WO 03/107327 | 12/2003 |
| WO | WO 2004/100602 A2 | 11/2004 |
| WO | WO 2006/117032 A | 11/2006 |
| WO | WO 2011/119168 A1 | 9/2011 |

OTHER PUBLICATIONS

Written Opinion of the International Searching Authority, PCT/US2012/62549, date of mailing Jan. 4, 2013, 4 pages.
International Preliminary Report on Patentability, PCT/US2012/062549, date of issuance May 5, 2015, 6 pages.
Office Action dated Jun. 14, 2013; for U.S. Appl. No. 12/254,488; 22 pages.
Response filed on Dec. 3, 2013; to Office Action dated Jun. 14, 2013; for U.S. Appl. No. 12/254,488; 11 pages.
Notice of Allowance dated Dec. 23, 2013; for U.S. Appl. No. 12/254,488; 11 pages.
European Search Report dated Apr. 24, 2008; for European Pat. App. No. EP 07 02 1121; 1 page.
European Application No. 12878823.9 Extended Search Report dated Jul. 20, 2016, 16 pages.
Sang-Mun Chi et al: "Lombard effect compensation and noise suppression for noisy Lombard speech recognition", Spoken Language, 1996. ICSLP 96. Proceedings., Fourth International Conference on Philadelphia, PA, USA Oct. 3-6, 1996, New York, NY, USA, IEEE, US, vol. 4, Oct. 3, 1996, pp. 2013-2016, XP010238177, DOI: 10.1109/ICSLP.1996.607193. ISBN: 978-0-7803-3555-4, 4 pages.
Jung et al: "On the Lombard Effect Induced by Vehicle Interior Driving Noises, Regarding Sound Pressure Level and Long-Term

(56) References Cited

OTHER PUBLICATIONS

Average Speech Spectrum", Acustica United With Acta Acustica, S. Hirzel Verlag, Stuttgart, DE, vol. 98, Mar. 1, 2012, pp. 334-341, XP008178809, ISSN: 1610-1928, DOI: 10.3813/AAA.918517. 8 pages.
Schmidt G et al: "Signal processing for in-car communication systems", Signal Processing, Elsevier Science Publishers B.V. Amsterdam, NL, vol. 86, No. 6, Jun. 1, 2006, pp. 1307-1326, XP024997680, ISSN: 0165-1684, DOI: 10.1016/J.SIGPRO.2005. 07.040. 20 pages.
Alfonso Ortega et al: "Cabin car communication system to improve communications inside a car", 2002 IEEE International Conference on Acoustics, Speech, and Signal Processing. Proceedings. (ICASSP). Orlando, FL, May 13-17, 2002; [IEEE International Conference on Acoustics, Speech, and Signal Processing (ICASSP)], New York, NY: IEEE, US, May 13, 2002, pp. IV-3836, XP032015678, DOI: 10.1109/ICASSP.2002, 5745493, ISBN: 978-0-7803-7402-7. 4 pages.
U.S. Appl. No. 14/406,628 Response to Office Action filed Jun. 30, 2016, 13 pages.
U.S. Appl. No. 14/406,628 Notice of Allowance dated Aug. 15, 2016, 12 pages.
U.S. Appl. No. 14/423,543 Final Office Action dated Aug. 29, 2016, 16 pages.
Chinese Office Action (with English translation) dated Aug. 10, 2016; for Chinese Pat. App. No. 201280074944.2; 22 pages.
Arslan et al. "New Methods for Adaptive Noise Suppression," IEEE, vol. 1, May 1995, 4 pages.
Ljolje et al. "Discriminative Training of Multi-Stage Barge-in Models," IEEE, Dec. 1, 2007, 6 pages.
Setlur et al. "Recognition-based Word Counting for Reliable Barge-In and Early Endpoint Detection in Continuous Speech Recognition," International Conference on spoken Language Processing, Oct. 1, 1998, 4 pages.
Ittycheriah et al. "Detecting User Speech in Barge-in Over Prompts Using Speaker Identification Methods," Eurospeech 99, Sep. 5, 1999, 4 pages.
Rose et al. "A Hybrid Barge-In Procedure for More Reliable Turn-Taking in Human-Machine Dialog Systems," $5^{th}$ International Conference on Spoken Language Processing, Oct. 1, 1998, 6 pages.
Decision to grant dated Feb. 28, 2014 for European Application No. 08013196.4; 52 pages.
Supplemental Decision to grant dated Jun. 5, 2014 for European Application No. 08013196.4; 43 pages.
Office Action dated Apr. 1, 2013 for U.S. Appl. No. 12/507,444, 17 pages.
Response to Office Action dated Aug. 1, 2013 U.S. Appl. No. 12/507,444, 16 pages.
Final Office Action dated Nov. 15, 2013 for U.S. Appl. No. 12/507,444, 19 pages.
Hansler et al. "Acoustic Echo and Noise Control: A Practical Approach", John Wiley & Sons, New York, New York, USA, Copy right 2004, Part 1, 250 pages.
Hansler et al. "Acoustic Echo and Noise Control: A Practical Approach", John Wiley & Sons, New York, New York, USA, Copy right 2004, Part 2, 221 pages.
Office Action dated Jun. 14, 2013 for U.S Appl. No. 12/254,488; 22 pages.
Response to Office Action dated Dec. 3, 2013 for U.S Appl. No. 12/254,488; 12 pages.
Notice of Allowance dated Dec. 23, 2013 for U.S. Appl. No. 12/254,488; 11 pages.
European Search Report Apr. 24, 2008 for European Application No. 07021121.4, 3 pages.
European Search Report dated Jun. 14, 2011 for European Application No. 7021932.4, 2 pages.
Decision to Grant dated Dec. 5, 2013 for European Application No. 7021932.4, 1 page.
Richardson et al. "LPC-Synthesis Mixture: A Low Computational Cost Speech Enhancement Algorithm", Proceedings of the IEEE, Apr. 11, 1996, 4 pages.
International Preliminary Report on Patentability dated Nov. 11, 2005 for PCT Application No. PCT/EP2004/004980; 8 pages.
Written Opinion dated Nov. 4, 2004 for PCT Application No. PCT/EP2004/004980; 7 pages.
Search Report dated Aug. 11, 2004 for PCT Application No. PCT/EP2004/004980; 3 pages.
Office Action dated Nov. 28, 2007 for U.S. Appl. No. 10/556,232; 17 pages.
Response to Office Action files Mar. 28, 2008 for U.S. Appl. No. 10/556,232; 11 pages.
Office Action dated May 29, 2008 for U.S. Appl. No. 10/556,232; 10 pages.
Response to Office Action files Aug. 29, 2008 for U.S. Appl. No. 10/556,232; 9 pages.
Office Action dated Dec. 9, 2008 for U.S. Appl. No. 10/556,232; 17 pages.
Response to Office Action files Mar. 9, 2009 for U.S. Appl. No. 10/556,232; 13 pages.
Office Action dated May 13, 2009 for U.S. Appl. No. 10/556,232; 17 pages.
Response to Office Action files May 29, 2009 for U.S. Appl. No. 10/556,232; 6 pages.
Notice of Allowance dated Aug. 26, 2009 for U.S. Appl. No. 10/556,232; 7 pages.
Notice of Allowance dated Jan. 15, 2014 for U.S. Appl. No. 11/924,987; 7 pages.
Office Action dated Jan. 7, 2014 for U.S. Appl. No. 13/518,406; 10 pages.
Response to Office Action filed May 5, 2014 for U.S. Appl. No. 13/518,406; 8 pages.
Final Office Action dated Jun. 10, 2014 for U.S. Appl. No. 13/518,406; 10 pages.
Response to Final Office Action filed Nov. 13, 2014 for U.S. Appl. No. 13/518,406; 11 pages.
Office Action dated Nov. 26, 2014 for U.S. Appl. No. 13/518,406; 6 pages.
Response to Office Action filed Feb. 17, 2015 for U.S. Appl. No. 13/518,406; 9 pages.
Notice of Allowance dated Mar. 10, 2015 for U.S. Appl. No. 13/518,406; 7 pages.
European Office Action dated Oct. 16, 2014 for European Application No. 10716929.4; 5 pages.
Decision to grant dated Jan. 18, 2016 for European Application No. 10716929.4; 24 pages.
Response to Written Opinion filed Jan. 9, 2015 for European Application No. 10716929.4; 9 pages.
International Preliminary Report on Patentability dated Oct. 2, 2012 for PCT Application No. PCT/US2010/028825; 8 pages.
Search Report dated Dec. 28, 2010 for PCT Application No. PCT/US2010/028825; 4 pages.
Written Opinion 2010 dated Dec. 28, 2010 for PCT Application No. PCT/US2010/028825; 7 pages.
U.S. Appl. No. 11/928,251.
U.S. Appl. No. 12/507,444.
U.S. Appl. No. 12/254,488.
U.S. Appl. No. 12/269,605.
U.S. Appl. No. 13/273,890.
U.S. Appl. No. 14/254,007.
U.S. Appl. No. 10/556,232.
U.S. Appl. No. 13/518,406.
U.S. Appl. No. 14/406,628.
U.S. Appl. No. 14/423,543.
Amendment filed on Nov. 14, 2016 to the Final Office Action dated Aug. 29, 2016; for U.S. Appl. No. 14/423,543, 8 pages.
RCE filed on Nov. 14, 2016 to the Final Office Action dated Aug. 29, 2016; for U.S. Appl. No. 14/423,543, 3 pages.
Chinese Office Action with English translation dated Nov. 16, 2016; for Chinese Pat. App. No. 201280076334.6; 13 pages.

(56) References Cited

OTHER PUBLICATIONS

Chinese Response with English claims filed Dec. 26, 2016 to Office Action dated Aug. 10, 2016; for Chinese Pat. App. No. 201280074944.2; 20 pages.
European Response (with Amended Claims and Replacement Specification Page) to European Office Action dated Aug. 5, 2016; Response filed on Jan. 25, 2017 for European Application No. 12878823.9; 10 Pages.

* cited by examiner

SPEECH ENHANCEMENT

TECHNICAL FIELD

The present invention relates to noise reduction in speech signal processing for automatic speech recognition and hands free speech communication.

BACKGROUND ART

In speech signal processing for automatic speech recognition (ASR) and hands free speech communication, a microphone signal is usually first segmented into overlapping blocks of appropriate size and a window function is applied. The speech signal processing can be performed in the time domain and/or in the frequency domain. Time domain processing operates directly on speech waveform signals while frequency domain processing operates on spectral representations of the speech signal.

Operations carried out in the frequency domain are achieved by a short-term Fourier transform (STFT). In this process, the sequence of sampled amplitude values x in dependence of the sample index i is multiplied with a window sequence w for every Rth sample and then discretely transformed to the frequency domain. This step is called analysis, and its realization is often referred to as an analysis filter bank:

$$X(k, \mu) = \sum_{i=0}^{L-1} x(i + Rk) w(i) e^{-j \frac{2\pi i \mu}{N}}$$

for each sample i, frame k, frequency bin μ, frame shift R, window length L, and DFT size N. After processing in the frequency domain, the resulting spectrum is transformed to the time domain again by an inverse STFT. In analogy to the previous step, this one is called synthesis, and its implementation is referred to as the synthesis filter bank.

Frequency domain processing produces noisy short-term spectra signals. In order to reduce the undesirable noise components while keeping the speech signal as natural as possible, SNR-dependent (SNR: signal-to-noise ratio) weighting coefficients are computed and applied to the spectra signals. Common noise reduction algorithms make assumptions to the type of noise present in a noisy signal. The Wiener filter for example introduces the mean of squared errors (MSE) cost function as an objective distance measure to optimally minimize the distance between the desired and the filtered signal. The MSE however does not account for human perception of signal quality. Also, filtering algorithms are usually applied to each of the frequency bins independently. Thus, all types of signals are treated equally. This allows for good noise reduction performance under many different circumstances.

However, mobile communication situations in an automobile environment are special in that they contain speech as their desired signal. The noise present while driving is mainly characterized by increasing noise levels with lower frequency. Speech signal processing starts with an input audio signal from a speech-sensing microphone. The microphone signal represents a composite of multiple different sound sources. Except for the speech component, all of the other sound source components in the microphone signal act as undesirable noise that complicates the processing of the speech component.

Separating the desired speech component from the noise components has been especially difficult in moderate to high noise settings, especially within the cabin of an automobile traveling at highway speeds, when multiple persons are simultaneously speaking, or in the presence of audio content. Often in high noise conditions, only a low output quality is achieved. Usually, speech signal components are heavily distorted to such an extent that desired speech components are masked by the background noise. Standard noise suppression rules classify these parts as noise; as a consequence, a maximum attenuation is applied.

SUMMARY

Embodiments of the present invention are directed to an arrangement for speech signal processing for automatic speech recognition and hands free speech communication. The processing may be accomplished on a speech signal prior to speech recognition, for example, with mobile telephony signals and more specifically in automotive environments that are noisy.

A signal pre-processor module transforms an input microphone signal into corresponding speech component signals. A noise suppression module applies noise reduction to the speech component signals to generate noise reduced speech component signals. A speech reconstruction module produces corresponding synthesized speech component signals for distorted speech component signals. A signal combination block adaptively combines the noise reduced speech component signals and the synthesized speech component signals based on signal to noise conditions to generate enhanced speech component signals for automatic speech recognition and hands free speech communication.

In further specific embodiments, the speech component signals may be time-domain speech component signals or frequency-domain speech component signals. The speech reconstruction module may use a non-linear function of speech components for producing the synthesized speech component signals. For example, distorted or missing harmonics of the speech component signals can be restored by the non-linear function.

The speech reconstruction module may use relevant features extracted from the distorted speech component signals for producing the synthesized speech component signals. The speech reconstruction module may use a source-filter model for producing the synthesized speech component signals. The speech reconstruction module may use a parametric model of envelope shape for producing the synthesized speech component signals. The speech reconstruction module may include a noise pre-processing module for noise suppression of the distorted speech component signals to provide speech synthesis reference signals. The speech reconstruction module may divide the distorted speech component signals into different frequency bands for producing the synthesized speech component signals.

DETAILED DESCRIPTION

Embodiments of the present invention are directed to enhancing highly distorted speech using a computationally efficient partial speech signal reconstruction algorithm. The partial signal reconstruction exploits the correlation of the speech components and replaces highly disturbed speech component signals with a corresponding synthesized speech component signal. The synthesized speech component signal is based on speech components with sufficient signal-to-noise ratio (SNR) using a nonlinear operator (nonlinear characteristic) as well as relevant features extracted from the noisy speech signal. The synthesized speech component signals are combined with the noise reduced speech component signals to generate an enhanced speech component signal output. Specific embodiments may operate on speech component signals in either the time domain or in the frequency domain. The following discussion is specific to operation in the frequency domain, but those in the field will appreciate that the principle of the invention is equally applicable to signal processing of time domain speech component signals.

Figure 1:
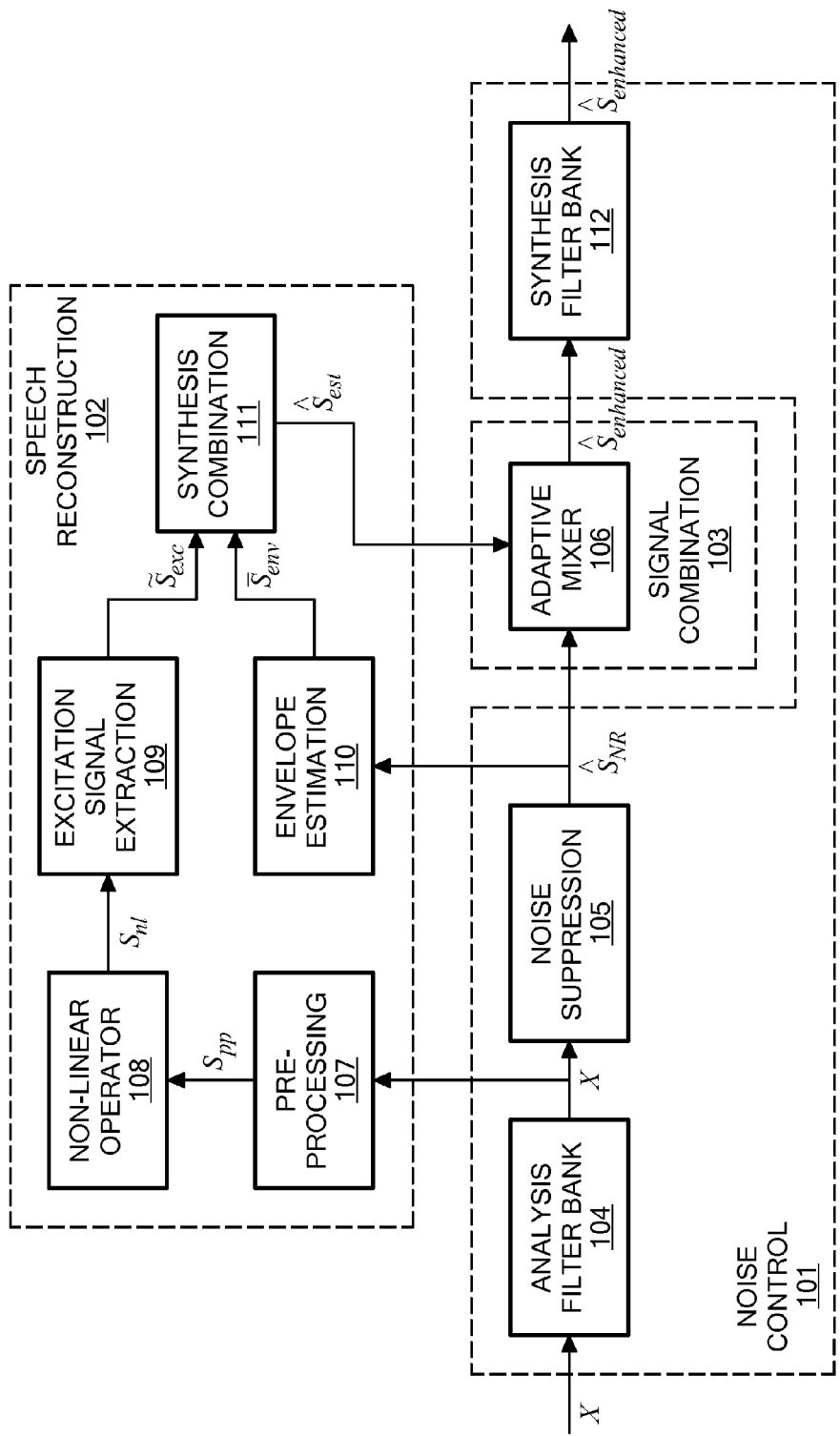
FIG. 1 shows various functional blocks in a system for speech signal processing for automatic speech recognition and hands free speech communication that uses synthesized speech reconstruction according to an embodiment of the present invention.
Figure 2:
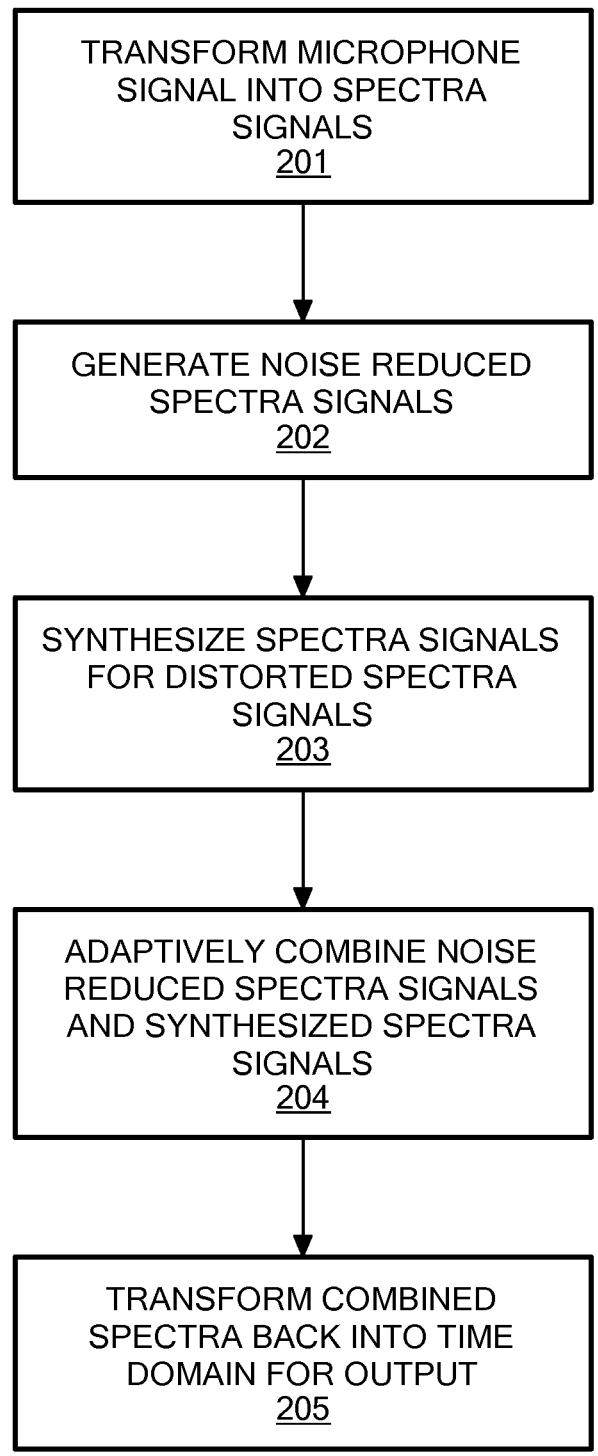
FIG. 2 shows various steps in a method of processing speech according to an embodiment of the present invention.

FIG. 1 shows various functional blocks in a system and FIG. 2 shows various steps in a method for speech signal processing for automatic speech recognition and hands free speech communication that uses synthesized speech reconstruction according to an embodiment of the present invention. Initially, an analysis filter bank 104 in noise control module 101 transforms an input microphone signal x into corresponding short term spectra signals X, step 201. A noise suppression module 105 then applies noise reduction to the short term spectra signals X to generate noise reduced spectra signals $\hat{S}_{NR}$, step 202. A speech reconstruction module 102 produces corresponding synthesized spectra signals $\hat{S}_{est}$ for distorted short term spectra signals X, step 203. And a signal combination block 103 includes an adaptive mixer 106 that adaptively combines the noise reduced spectra signals $\hat{S}_{NR}$ and the synthesized spectra signals $\hat{S}_{est}$ based on signal to noise conditions and extracted features from the input (e.g. voiced/unvoiced classification, variability of the short-term spectrum), step 204, and transforms the resulting enhanced speech signal $\hat{S}_{enhanced}$ in a synthesis filter bank 112 performing an inverse STFT and summing the frames back into a time-domain enhanced speech signal $\hat{s}_{enhanced}$ for automatic speech recognition and hands free speech communication, step 205.

Looking in greater detail at the speech reconstruction module 102, a noise pre-processing module 107 utilizes a noise suppression algorithm to attenuate undesired signal components. Typically, high noise attenuation (e.g., about 30 dB) is applied by the pre-processing module 107 to generate a greatly noise-reduced reference signal $\hat{S}_{PP}$ for properly regenerating distorted speech components.

Non-linear operator module 108 regenerates distorted or missing harmonics of the noise-reduced reference signal $\hat{S}_{NR}$ utilizing a nonlinear function that applies a nonlinear characteristic to a harmonic signal to produce a non-linear speech signal $\hat{S}_{nl}$ that has sub- and super-harmonics. Normally a nonlinear characteristic can only be applied efficiently (in terms of computational complexity) to speech signals in the time-domain, and using a nonlinear function for speech signal processing in the frequency domain comes at a much higher computational cost. So for efficiency reasons, in the frequency domain the non-linear operator module 108 may apply the non-linear operation using auto-convolution of a subset of the current sub-band signals. For example, the non-linear operator module 108 may divide the short-term spectrum into different frequency ranges (e.g., into 1 kHz bands from 100 Hz up to 4 kHz) and depending on the measured variability within each band, an upper frequency limit for the convolution can be adaptively determined. In embodiments operating on time domain speech component signals, the non-linear operator module 108 may apply a non-linear operation based on, for example, a quadratic characteristic or a half-way rectification of the speech component signals.

An excitation signal generator 109 receives the non-linear speech signal $S_{nl}$ and for voiced signals generates a synthetic excitation signal $\tilde{S}_{exc}$ having harmonics at the desired frequencies but with biased amplitudes. In order to reduce the bias, the excitation signal generator 109 may divide the incoming non-linear speech signal $S_{nl}$ by its envelope.

A separate envelope estimation module 110 estimates the frequency-domain envelope $\overline{S}_{env}$ of the original short term spectra signals X. The envelope estimation module 110 can operate on-line in real time using a novel approach having a very low computational power cost. The envelope estimation module 110 analyzes the filter coefficients of the noise reduced spectra signals $\hat{S}_{NR}$ from the noise suppression module 105 to distinguish frequency bins of the preliminary envelope with high and low speech signal-to-noise power estimation. The high SNR bins are used as supporting points for the re-estimation of the bins with low SNR.

Synthesis combination module 111 uses a source-filter model to combine the estimated envelope $\overline{S}_{env}$ and the synthesis excitation signal $\tilde{S}_{exc}$ to generate synthesized spectra signals $\hat{S}_{est}$ that reconstruct the original undisturbed speech spectrum as accurately as possible.

The adaptive mixer 106 adaptively combines the synthesized spectra signals $\hat{S}_{est}$ with the noise reduced spectra signals $\hat{S}_{NR}$ to produce enhanced frequency domain speech signals $\hat{S}_{enhanced}$. At low SNRs, highly distorted noise reduced spectra signals $\hat{S}_{NR}$ are replaced by the synthesized spectra signals $\hat{S}_{est}$. At more moderate SNR conditions (i.e. medium and high SNRs), only the magnitudes of the spectra signals $\hat{S}_{est}$ and of the noise reduced spectra signals $\hat{S}_{NR}$ are adaptively combined. The adaptive mixer 106 afterwards combines the resulting magnitude estimate with the phase of the noise reduced spectra signals $\hat{S}_{NR}$. Thus speech reconstruction is performed just for degraded voiced speech components. The synthesized phase is only applied for highly degraded voiced speech components.

A voice activity detector can be used to detect the presence of speech segments, and a voiced speech detector can be used to detect voice speech components. To detect corrupted voiced speech components, the adaptive mixer 106 can perform a comparison at each frequency bin between the synthesized spectra signals $\hat{S}_{est}$ and the noise reduced spectra signals $\hat{S}_{NR}$. The amplitudes of the synthesized spectra signals $\hat{S}_{est}$ at the pitch frequency and at harmonics are always greater than the noise reduced spectra signals $\hat{S}_{NR}$ (for degraded speech components [highly degraded harmonics]. If the harmonics are degraded the noise reduction filter will apply a maximum attenuation.) Thus the speech reconstruction is only performed at those frequency bins where the synthesized spectra signals $\hat{S}_{est}$ are greater than the noise reduced spectra signals $\hat{S}_{NR}$ by a specified margin.

Figure 3A:
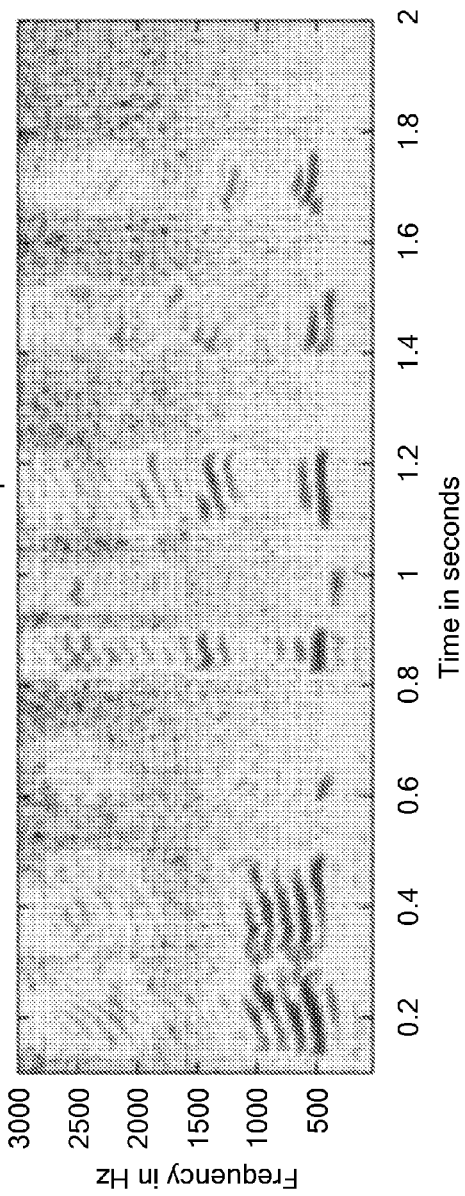
FIG. 3 A-B shows time frequency graphs of a noisy speech signal of a conventionally noise reduced speech signal without and with speech reconstruction.
Figure 3B:
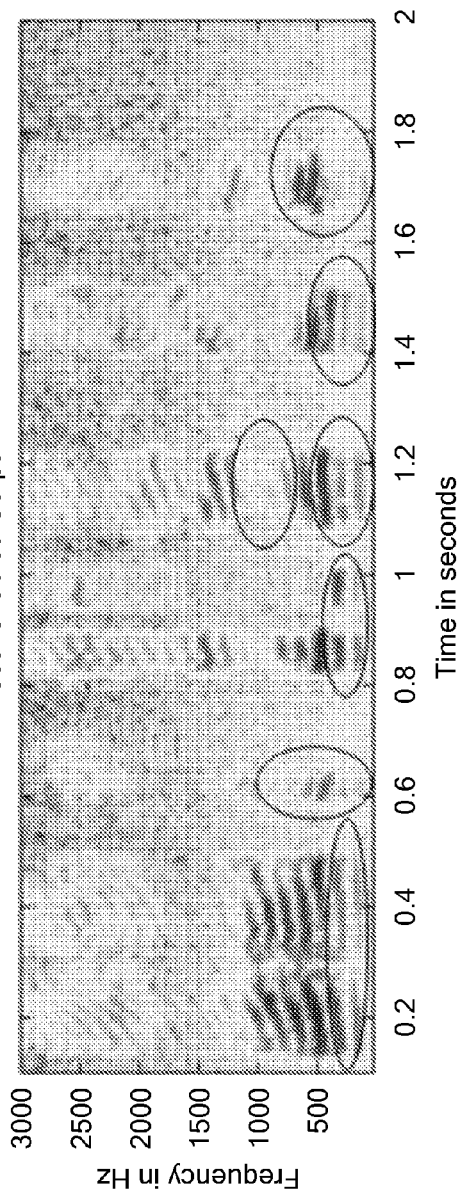

FIG. 3 A-B shows time-frequency analyses of a noisy speech signal measured in a car at high speed (at about 160 km/h). FIG. 3A shows a time-frequency analysis of a conventional noise reduced signal. FIG. 3B shows an analysis of the outcome after partial speech reconstruction. The black ellipses in FIG. 3B denote the reconstructed speech components. Comparing these results one can see that missing speech components are successfully regenerated after using partial reconstruction.

Looking back at the envelope estimation more formally, the task of the envelope estimation module 110 is to estimate the smoothed spectrum of the clean speech signal as closely as possible. A decision is made as to how to separate the contributions of the voiced excitation and the vocal tract to the clean speech spectrum so as to supply comparable results. A time-smoothed version $\hat{\Phi}_{\tilde{D}\tilde{j}}$ of the noisy speech amplitude spectrum $\hat{\Phi}_X$ can be used as an initial estimate for the noise spectrum, and the smoothing can be implemented using a first-order infinite impulse response (IIR) filter in forward and backward direction with a discrete-time smoothing constant $\gamma_{\tilde{i}}$:

$$\hat{\Phi}_{\tilde{D}\tilde{j}}(k=0, \mu) := \hat{\Phi}_X(k=0, \mu)$$

$$\hat{\Phi}_{\tilde{D}\tilde{j}}(k, \mu) := \gamma_{\tilde{i}} \hat{\Phi}_{\tilde{D}\tilde{j}}(k-1, \mu) + (1-\gamma_{\tilde{i}}) \hat{\Phi}_X(k, \mu)$$

where the discrete-time smoothing constant $\gamma_{\tilde{i}}$ is given by:

$$\gamma_{\tilde{i}} = \exp\left(\frac{-R}{\tau_{\tilde{i}} f_s}\right)$$

where R is the frame shift, $\tau_{\tilde{i}}$ is a selected (continuous) decay time constant, and $f_s$ is the sampling frequency. Note that the smoothing can also be applied in the linear domain to reduce computational cost.

The smoothed amplitude spectrum of the microphone or of the noise reduced signal is a good estimator of the envelope at high SNR conditions. But at low SNR levels, reliable estimation no longer can be achieved, especially at low frequencies if speech formants are masked by the background noise. Hence the envelope estimation module 110 can develop the envelope estimation using a parametric model for the shape of the envelope $\bar{S}_{env}$. To extrapolate towards lower frequencies, a logarithmic parabola can be used, while for interpolating between higher frequencies, a logarithmic hyperbola form can be applied. These two specific shapes have been heuristically derived from observed envelope shapes and then modified by several parameters. The hyperbola shape is fully determined by its maximum steepness, while the parabola shape can use three parameters: (1) the starting slope at the good bin with the lowest frequency, (2) the amount of curvature, and (3) the maximum slope allowed. For that purpose, the envelope estimation module 110 can easily extract several features from the noise reduced spectra signals $\hat{S}_{NR}$ to determine a useful estimate for the curves' parameters. A functional dependency between the features and the optimal parameters can be established off-line from a training data set. This way, the cost of the computational power under operating conditions stays minimal. The features used may be, for example, the slope of the reference spectrum for the parabola shape, and the distance between the neighboring good bins for the hyperbola shape. Applying the resulting parametric estimation process on a test data set yields better estimation results than a state-of-the-art codebook approach which is also much more expensive in terms of memory and computational power requirements.

For off-line parameter optimization based on a training data set of clean speech, the same definition can be used for the known signal's amplitude spectrum $\hat{\Phi}_S$:

$$\bar{S}(k, \mu) := \text{IIR}\{10 \log_{10} \hat{\Phi}_S(k, \mu)\}$$

The estimation task is the minimization of the sum of absolute differences in each relevant frame.

On modern computers, unsupervised vector quantization methods such as a codebook approach are mainly used to reduce the dimension of a feature space in order to save memory space and computation power. But codebook based estimation is still in common use in embedded systems, where these resources are limited. In the training step, codebooks store information on prototype feature vectors extracted from a database. In the testing step, incomplete feature vectors can be matched against all codebook entries by use of a cost or distance function. The codebook entry that best matches the incomplete vector is used to fill in missing features. In the task at hand, missing features are frequency bins where the corresponding filter coefficients lie below a certain threshold, thus indicating a low SNR. In these bins, the estimate amplitude value is dominated by the noise power, and the speech power is bound to be much lower. A codebook can be implemented using the well-known Linde-Buzo-Gray (LBG) algorithm for training on clean speech signal envelopes using 256 feature vectors each with M amplitude values.

Besides the codebook approach, other estimation methods can be considered, for example, based on bin-wise computation of available spectral information. In frequency bins where the noise estimation is accurate and close to 0, the noise reduction filter will output coefficients near 1 or 0 dB on a logarithmic scale. Here, the microphone spectrum provides a fairly good estimate for the speech spectrum at high SNR levels.

Microphone. The noisy microphone signal's amplitude spectrum $\hat{\Phi}_X$ can be smoothed and used as a first approximation:

$$\bar{S}_{Mic}(k, \mu) := \bar{X}(k, \mu)$$

As is to be expected, this approximation only works well where no or very little noise is present. It can however be useful as a source of information applied by other estimators.

Average. While similar to the microphone estimator, an average estimation method indirectly takes into account the filter coefficients $H(k, \mu)$ available from a preceding noise reduction. These can range from the spectral floor up to a value of 1 and contain information on how much noise is present in each bin $\mu$ and frame k. Higher values indicate a better SNR. The actual implementation can rely on the smoothed amplitudes of the noise reduced spectra signals $\hat{S}_{NR}$:

$$\bar{S}_{Avg}(k, \mu) := \frac{1}{2}\left(\bar{X}(k, \mu) + \hat{\bar{S}}_{NR}(k, \mu)\right)$$

As explained above, in a separate processing stage, the frequency-domain envelope of the original speech signal is estimated. The estimated envelope is then imprinted on the generated excitation signal in order to reconstruct the original speech spectrum as accurately as possible. The envelope estimation is implemented in a novel way that can be applied online at a very low computational power cost. First, the noise suppression filter's coefficients are analyzed to distinguish bins with good and bad speech signal power estimation. The well-estimated bins are then used as supporting points for the estimation of the badly estimated ones. The estimation itself consists in the use of a parametric model for the envelope shape. For extrapolating towards low frequencies, a logarithmic parabola is used. The shape is derived from observed envelope shapes and is modified by several parameters, such as the parabola's curvature. Several features can easily be extracted from the signal, such as the position of the lowest well estimated frequency bin. These features are used to determine a good estimate for the curves' parameters.

Disturbances in the low frequency spectrum are prevalent in hands-free automobile telecommunication systems. Typically a number of consecutive low-frequency bins do not offer enough speech signal information for estimating the envelope at that frequency bin. In a linear extrapolation approach, missing envelope information can be approximated by constructing a straight line in the logarithmic amplitude spectrum.

The lowest well-estimated bin's index in a frame k is referred to as $\mu°(k)$, and the logarithmic amplitude value in that place is $\tilde{S}_{Avg}(k, \mu°(k))$ (NB: other preliminary estimators could be used, for example, $\tilde{S}_{NR}(k, \mu°(k))$. The line can be fixed to this point retaining one degree of freedom, namely its slope $m_{line}(k)$. This parameter can be estimated from the signal's features with the estimated amplitude values calculated iteratively. This gives a straight line in logarithmic space depending on the slope $m_{line}(k)$, which is set to a value leading to a good approximation of the actual spectral amplitudes.

Parabolic Extrapolation. It is not known directly whether the low-frequency band contains an obscured formant or not. As an extension to the aforementioned linear extrapolation, a parabolic estimation model can be parameterized by the slope of the reference estimation to guess the optimal course of the envelope. This can be more flexible than the linear method, including it as a special case. Hence, it bears an equal-or-better potential performance but also introduces higher worst-case errors. From the reference estimation, a reference slope $m_R$ can be computed:

$$m_R := \sqrt{\frac{\tilde{S}_{Avg}(k, \mu°(k) - 1)}{\tilde{S}_{Avg}(k, \mu°(k) + 1)}}$$

and used to determine the parabola's initial slope $m°(k)=m(k, \mu°)=m_R$ at $\mu°$. The curve can be fixed by setting the remaining degree of freedom, called here the curvature $J(k)$. Additionally, a restriction on the curve's maximum slope $m_{max}$ can be introduced and the minimum slope can be restricted to that of the estimated noise amplitude spectrum:

$$m_{\hat{D}}(k, \mu) := \frac{\hat{\Phi}_{\hat{D}}(k, \mu)}{\hat{\Phi}_{\hat{D}}(k, \mu + 1)}$$

For lower frequencies, $\tilde{S}(k, \mu)=p(k, \mu)$, to be precise, from $\mu=0$ up to $\mu=\mu°(k)$. For these frequencies we use a parametric model to achieve a reliable estimator for the envelope. For the remaining frequencies (i.e. from $\mu=\mu°(k+1)$ up to $\mu=M-1$ one can use the average envelope (i.e. $\tilde{S}(k, \mu))=\tilde{S}_{avg}(k, \mu)$). Given the previously mentioned parameters, the parabola p $(k, \mu)$ can be calculated iteratively by counting the bin index $\mu$ down from $\mu°$ with the following algorithm:

$$p(k, \mu) := J(k) \cdot p(k, \mu+1) \cdot \max\{m_{\hat{D}}, \min\{m_{max}, m(k, \mu)\}\}$$

where the slope $m(k, \mu)$ is:

$$m(k, \mu) := \begin{cases} m°(k) & \text{for } \mu = \mu°, \\ \frac{p(k, \mu+1)}{p(k, \mu+2)} & \text{otherwise} \end{cases}$$

This results in a parabolic shape that is determined by the parameters initial slope $m°(k)$, curvature $J(k)$, and minimum slope $m_{min}(k)$, as well as on the course of the noise spectrum via $m_{\hat{D}}$.

In the foregoing the construction of a parabolic curve depending on parameters was described. But it has not yet been formally defined how these parameters are derived from the features extracted from the available information. Functional dependencies between the features and the optimal parameters can be established off-line from a training data set to obtain a simple constant or linear dependency from a feature to a parameter. In this way, the computational power cost under operating conditions stays minimal.

Detecting functional dependencies can be performed in two steps. In the first one, a minimum search for the cost function can be performed on the available parameters. This establishes the optimum approximation that a model is capable of. The parameters defining this optimal approximation can be saved together with the feature extracted from information that would be available also in testing conditions. In the second step, the tuples of features and corresponding optimal parameters can be analyzed to detect approximate functional dependencies between them. If there appears to be a dependency, a zero- to second-order polynomial can be fit on the data to represent it. This can be evaluated in a testing step.

Optimum Parameter Detection and Feature Extraction. First, the testing data set can be searched for frames in which reconstruction can likely be successfully performed. Criterion for exclusion may be insufficient voiced excitation power (with modified parameters). The band used goes from $f_{low}=800$ Hz to $f_{high}=2400$ Hz, and the threshold value is $P_{VUD}=2$ dB. In the remaining frames, the noisy signals can be processed and the envelope estimation parameters for each gap in the smoothed spectrum can be optimized to approximate the known clean speech smoothed spectrum. The cost function C used in each frame k for finding the best fit of the parametric model $\tilde{S}(k,\mu)$ on the clean speech smoothed amplitude spectrum $\overline{S}(k, \mu)$ is the mean squared logarithmic spectral distortion:

$$C(k) := \sum_{\mu=0}^{M-1} \left( \log_{10} \frac{\overline{S}(k, \mu)}{\hat{\tilde{S}}(k, \mu)} \right)^2$$

Apart from the optimized parameters for each frame, several features can be extracted from the noisy speech signal. These features may be likely to carry valuable information on the corresponding optimal parameters. Note that no features need be taken from the known clean speech signals, but from the noisy speech signals only. The optimal parameters together with the corresponding features can be treated as a tuple for each relevant frame, and all of the tuples can be sequentially written to a single file.

Applying the parametric estimation process on a testing data set yielded better estimation results than the codebook approach which is also much more expensive in terms of memory and computation power requirements. Even a limited amount of available training data sufficed to improve the results. While the "average" estimator gave a good reference even for some of the badly estimated frequency bins, it failed to provide a good estimation under low-SNR conditions. After un-biasing, it was still the best choice in situations with high SNR due to its very low complexity. The codebook approach spread the mean error evenly over the spectrum and thus performed better in very low frequencies where other estimators have difficulties, especially the non-parametric ones. It did not profit very much from un-biasing and had a singular advantage at 100 km/h in very low frequencies. It was not obvious why this was the case. Its demanding complexity in memory and computation power was not justified by its performance. Under high-noise conditions, the "parabola" and "line" estimators yielded the best results of the tested estimators, the latter slightly outperforming the former. However, the "parabola" estimation profited more from un-biasing than the "line" method. This makes it a viable choice, since the absolute computation power needed is only slightly higher than that of the "line" estimator.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware.

Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for speech signal processing for automatic speech recognition and hands free speech communication, the method comprising:
    transforming an input microphone signal into corresponding speech component signals;
    applying noise reduction to the speech component signals to generate noise reduced speech component signals;
    applying a non-linear function to distorted speech component signals to generate non-linear speech signals;
    estimating an envelope of the speech component signals;
    for voice signals of the non-linear speech signals, generating synthetic excitation signals having harmonics at predetermined frequencies, wherein the generated synthetic excitation signals are based upon the non-linear speech signals and their corresponding envelopes;
    combining the estimated envelope of the speech component signals and the synthetic excitation signals to produce synthesized speech component signals; and
    adaptively combining the noise reduced speech component signals and the synthesized speech component signals based on signal to noise conditions and extracted features from the input to generate enhanced speech component signals for automatic speech recognition and hands free speech communication,
    wherein the enhanced speech components signals are used to recognize the input microphone signal.

2. The method according to claim 1, wherein the speech component signals are time domain speech component signals.

3. The method according to claim 1, wherein the speech component signals are frequency domain speech component signals.

4. The method according to claim 1, wherein the non-linear function operates to restore distorted or missing harmonics of the distorted speech component signals.

5. The method according to claim 1, wherein relevant features extracted from the distorted speech component signals are used for producing the synthesized speech component signals.

6. The method according to claim 1, wherein a source-filter model is used for producing the synthesized speech component signals.

7. The method according to claim 1, wherein the envelop of the speech component signals is estimated using a parametric model for a shape of the envelop.

8. The method according to claim 1, wherein applying the non-linear function to distorted speech component signals includes dividing the distorted speech component signals into different frequency bands and adaptively determining an upper frequency limit for a convolution of a subset of the distorted speech component signals used to generate the non-linear speech signals based on a measured variability within each of the different frequency bands.

9. The method according to claim 1, wherein the non-linear function is applied to the distorted speech component signals using auto-convolution of a subset of the distorted speech component signals.

10. The method according to claim 1, wherein applying the non-linear function to distorted speech component signals includes attenuating undesired signal components from the distorted speed component signals to generate reference signals for speech reconstruction, and applying the non-linear function to the reference signals to generate the non-linear speech signals.

11. The method according to claim 1, wherein generating the synthetic excitation signals includes performing a mathematical operation on the non-linear speech signals using their corresponding envelopes to generate the synthetic excitation signals.

12. The method according to claim 1, wherein generating the synthetic excitation signals includes dividing the non-linear speech signals by their corresponding envelopes to generate the synthetic excitation signals.

13. The method according to claim 1, wherein the envelop is estimated based on filter coefficients of a filter applied to the speech component signals to generate the noise reduced speech component signals.

14. The method according to claim 1, wherein applying the non-linear function to distorted speech component signals includes applying a non-linear function to a harmonic signal to generate non-linear speech signals having sub-harmonics and super-harmonics.

15. The method according to claim 1, wherein adaptively combining the noise reduced speech component signals and the synthesized speech component signals includes: at a first signal-to-noise ratio, replacing the noise-reduced speech component signals with the synthesized speech component signals, and at a second signal-to-noise ratio that is higher than the first signal-to-noise ratio, adaptively combining magnitudes of the noise-reduced speech component signals and the synthesized speech component signals.

16. The method according to claim 1, wherein the extracted features from the input include variability of the speech component signals and voice/unvoiced classification of the speech component signals.

17. A speech signal processing system for automatic speech recognition and hands free speech communication employing at least one hardware implemented computer processor, the system comprising:

a signal pre-processor for transforming an input microphone signal into corresponding speech component signals;

a noise suppression module for applying noise reduction to the speech component signals to generate noise reduced speech component signals;

a non-linear operator module for applying a non-linear function to distorted speech component signals to generate non-linear speech signals;

an envelope estimation module for estimating an envelope of the speech component signals;

an excitation signal generator for generating synthetic excitation signals having harmonics at predetermined frequencies for voice signals of the non-linear speech signals, wherein the generated synthetic excitation signals are based upon the non-linear speech signals and their corresponding envelopes;

a synthesis combination module for combining the estimated envelope of the speech component signals and the synthetic excitation signals to produce synthesized speech component signals; and a signal combination block for adaptively combining the noise reduced speech component signals and the synthesized speech component signals based on signal to noise conditions to generate enhanced speech component signals for automatic speech recognition and hands free speech communication, wherein the enhanced speech components signals are used to recognize the input microphone signal.

18. The system according to claim 1, wherein the non-linear function operates to restore distorted or missing harmonics of the distorted speech component signals.

19. The system according to claim 17, wherein the speech reconstruction module uses relevant features extracted from the distorted speech component signals for producing the synthesized speech component signals.

20. The system according to claim 17, wherein the non-linear operator module divides the distorted speech component signals into different frequency bands and adaptively determines an upper frequency limit for a convolution of a subset of the distorted speech component signals used to generate the non-linear speech signals based on a measured variability within each of the different frequency bands.

* * * * *